(12) United States Patent
Joehren

(10) Patent No.: US 9,641,364 B2
(45) Date of Patent: May 2, 2017

(54) COMMUNICATION CIRCUIT AND APPROACH WITH MODULATION

(71) Applicant: NXP B.V., Eindhoven (NL)

(72) Inventor: Michael Joehren, San Jose, CA (US)

(73) Assignee: NXP B.V., Eindhoven (NL)

(*) Notice: Subject to any disclaimer, the term of this patent is extended or adjusted under 35 U.S.C. 154(b) by 161 days.

(21) Appl. No.: 14/292,199

(22) Filed: May 30, 2014

(65) Prior Publication Data

US 2015/0349849 A1    Dec. 3, 2015

(51) Int. Cl.
*H04B 5/00* (2006.01)
*H04L 27/06* (2006.01)
(Continued)

(52) U.S. Cl.
CPC ............ *H04L 27/06* (2013.01); *H04B 1/401* (2013.01); *H04B 5/0025* (2013.01);
(Continued)

(58) Field of Classification Search
CPC .. H04B 5/0031; H04B 5/0081; H04B 5/0062; H04B 5/0012; H04B 5/00; H04B 5/0075; H04B 5/0056; H04B 5/0093; H04B 5/02; H04B 5/0018; H04B 5/0087; H04B 17/102; H04B 5/0006; H04B 5/0025; H04B 5/0068; H04B 1/04; H04B 5/0037; H02J 5/005; H02J 7/025; H02J 17/00; H02J 2007/0096; H02J 7/04; H02J 7/12; G06K 19/0723; G06K 19/0701; G06K 7/0008; G06K 7/10237; G06K 19/0702; G06K 19/0715; G06K 19/07749; G06K 19/0705; G06K 19/0724; G06K 19/07767; G06K 19/07779; G06K 19/07783; G06K 7/10336
See application file for complete search history.

(56) References Cited

U.S. PATENT DOCUMENTS 8,274,370 B2   9/2012  Friedrich et al.
8,503,199 B1 * 8/2013  Chapuis ............ H02M 3/33576
                                              363/21.06
(Continued)

FOREIGN PATENT DOCUMENTS

JP   2005521976 A    7/2005
JP   2010-246292 A   10/2010
(Continued)

OTHER PUBLICATIONS

Extended European Search Report for EP Patent Appln. No. 15167079.1 (Oct. 6, 2015).

*Primary Examiner* — Golam Sorowar

(57) ABSTRACT

Various aspects of the present disclosure involve communications, and more specifically wireless communications with modulation. As may be implemented in accordance with one or more embodiments, a rectifier having a plurality of active circuits operates in first and second modes to modulate signals communicated via an antenna as follows. The first mode is at least a half-active mode in which at least one of the active circuits passes the signal, and the second mode consumes less power than the first mode. A modulator modulates a waveform of the signal by selectively operating at least one of the plurality of active circuits, therein setting an impedance of the rectifier and modulating an amplitude of the signal.

18 Claims, 3 Drawing Sheets

(51) Int. Cl.
 *H04W 4/00* (2009.01)
 *H04B 1/401* (2015.01)
(52) U.S. Cl.
 CPC .......... *H04B 5/0075* (2013.01); *H04W 4/008* (2013.01); *Y02B 60/50* (2013.01)

(56) References Cited

U.S. PATENT DOCUMENTS

| | | | | |
|---|---|---|---|---|
| 2010/0291870 A1* | 11/2010 | Butler | ................ | G06K 19/0701 455/41.1 |
| 2011/0241436 A1 | 10/2011 | Furukawa | | |
| 2013/0009609 A1* | 1/2013 | Andersen | ............. | A61B 5/0002 320/166 |
| 2013/0103115 A1* | 4/2013 | Dronov | ................ | A61N 1/3787 607/60 |
| 2013/0147281 A1* | 6/2013 | Kamata | ................... | H02J 7/025 307/104 |
| 2013/0221758 A1* | 8/2013 | Kai | ......................... | H02J 5/005 307/104 |
| 2014/0117771 A1* | 5/2014 | Kwon | .................... | H02J 5/005 307/104 |
| 2014/0361736 A1* | 12/2014 | Kwon | .................... | H02J 7/025 320/108 |

FOREIGN PATENT DOCUMENTS

| | | |
|---|---|---|
| KR | 101236319 B1 | 2/2013 |
| KR | 101328209 B1 | 11/2013 |
| WO | 2014039088 A1 | 3/2014 |

* cited by examiner

COMMUNICATION CIRCUIT AND APPROACH WITH MODULATION

Aspects of various embodiments are directed to communications and related circuitry, and to modulation.

Many types of communication circuits use modulation schemes to impart data to signals. Wireless data communications are one such type of communication circuit, in which modulated signals are demodulated and data is extracted. The data is then used, and return communications may also be carried out via a common circuit.

A variety of types of wireless data communications are implemented for various approaches, some of which also involve the transmission of wireless power. For instance, systems such as near field communication (NFC) systems, and those using wireless power standards such as the Qi standard by the Wireless Power Consortium (WPC) and standards set by the Power Matters Alliance (PMA) use a constant carrier to transmit power from a transmitter (TX) to a receiver (RX) device. The receiver can also act as a data transmitter using in-band communication to send data back to the transmitter.

In wireless charging standards as well as semi-passive radio-frequency identification (RFID) systems, data may be coded using ASK (Amplitude Shift Keying) modulation. The modulation can be achieved by changing rectifier impedance using a switching transistor with defined impedance to ground. While this approach is useful, additional components such as a switching transistor and resistor or impedance control circuit may be required. Further, additional power losses may be incurred, which reduces efficiency.

These and other matters have presented challenges to communications, for a variety of applications.

Various example embodiments are directed to communication circuits and their implementation involving the modulation of signals.

According to an example embodiment, an apparatus includes an antenna circuit that provides a signal having a waveform, a rectifier circuit and a modulator circuit. The rectifier circuit has a plurality of active circuits and an output port, operates in a first mode that is at least a half-active mode in which at least one of the active circuits passes the signal, and in a second mode that consumes less power than the first mode. The modulator circuit modulates the waveform by selectively operating at least one of the plurality of active circuits, therein setting an impedance of the rectifier circuit and modulating an amplitude of the signal.

Another embodiment is directed to an apparatus including a rectifier, inductive antenna and a modulator. The rectifier has two current paths connected in parallel between input and output nodes, each current path including a first active circuit component and second circuit component that is either active or passive and connected in series with the first active circuit, via an alternating current (AC) node. The active circuits are operable to pass a signal in an on state and to block the signal in an off state. The inductive antenna has a first end connected to the AC node in a first one of the current paths and a second end connected to the AC node in the second one of the current paths, and provides both wireless power and a signal via the AC nodes. The modulator operates using the wireless power and modulates the signal, setting an impedance of the rectifier by operating the active circuits in respective on and off states. In some implementations, the both circuits in the current path are active circuits for full-active operation in an on state of the active circuits, and controllable via the modulator.

Various other embodiments are directed to methods consistent with the above, and portions or combinations thereof.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

Figure 1:
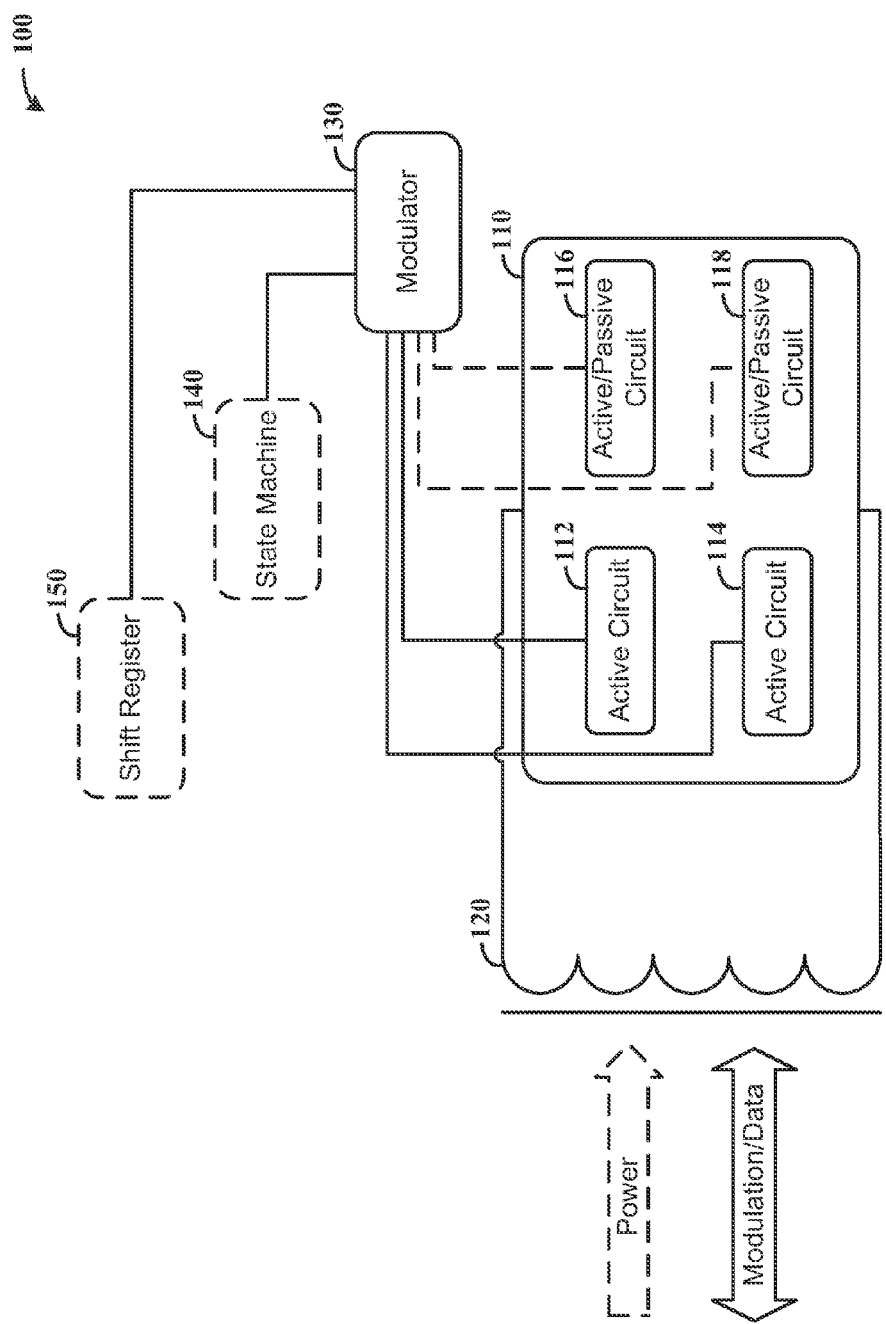
FIG. 1 shows a communication circuit, in accordance with another example embodiment.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Aspects of the present disclosure are believed to be applicable to a variety of different types of apparatuses, systems and methods involving communications, such as wireless communications employing modulation schemes. While not necessarily so limited, various aspects may be appreciated through a discussion of examples using this context.

Various example embodiments are directed to a modulation approach for wireless communications, such as for NFC applications and/or applications involving wireless power transfer (e.g., for wirelessly charging a battery). Many such embodiments involve communications in wireless power transfer systems using a rectifier, and modulation schemes such as multilevel amplitude modulation. Such embodiments may be implemented with wireless power receivers, which include a rectifier and a switch that operate to receive power and a received carrier signal, with the switch being operative to change an impedance of the rectifier. The rectifier includes one or more passive devices, and in various embodiments includes a full-active or half-active rectifier. Consistent with embodiments herein, these approaches may be implemented without adding an additional path to ground.

In accordance with various embodiments, a rectifier having active circuits and a modulator operates using a modulation approach for wireless signals communicated via an antenna. The modulator controls the active circuits in an at least partially-active (e.g., half-active or full-active) mode to modulate the wireless signals, in which the active circuits and/or a combination of the active circuits with passive circuits are used. The modulator sets an impedance of the rectifier in this regard, which can be implemented for modulating the amplitude of a signal. One or more of the active circuits may be disabled in a low-power mode.

In some embodiments involving highly efficient wireless power receivers such as RFID receivers, the rectifier is operated as a full-active or half-active rectifier. The rectifier may include, for example, four rectifier components including a combination of two power transistors and two diodes, or four power transistors. Such an approach can be used in applications for which two or four passive diodes are replaced with the active circuits (e.g., power transistors), reducing power loss that may be incurred with diode-based implementations in which such active circuits are not implemented.

By controlling active rectifier transistors such that an active switching function can be disabled for each individual transistor for a number of cycles, the impedance of the rectifier can be accordingly set/increased, with a maximum impedance set when all transistors are disabled and the rectifier is working in a passive mode. In a full passive mode (e.g., with transistors as above turned off and diodes imparting modulation), a single tie to a ground/reference level can be implemented with the switching used to change impedance (and therein modulate), without necessarily implementing a separate tie to the ground/reference level for effecting the impedance change.

In more particular embodiments, a rectifier having active transistors implements an ASK modulation scheme in which five levels are generated for an active full-bridge rectifier. In other implementations, three levels are generated for a half-active rectifier. Active impedance control is carried out with switching transistors to generate additional interim values. Accordingly, overall rectifier efficiency can be set based on the number of active switching transistors. Such an approach may, for example, use CMOS transistors with intrinsic arsenic (As).

In the context of various embodiments, the term modulation refers to the modulation of signals, and as may be implemented for demodulation of such signals to extract data therefrom. In this regard, various embodiments are directed to transmission, reception or both. Further, while ASK modulation is described in various contexts, various embodiments involve other types of modulation.

According to another example embodiment, a rectifier has active circuits operable in an at least half-active mode in which at least one of the active circuits passes the signal, and in a second mode that consumes less power than the first mode. A modulator modulates a signal by selectively operating at least one of the plurality of active circuits, which sets an impedance of the rectifier and modulating an amplitude of the signal. Such an approach can be used for signals communicated via an antenna, such as for wireless power and data transfer. In some embodiments, the apparatus also includes a capacitive energy-coupling circuit that provides energy harvested from wireless signals received via the antenna. This energy can be used to carry out the modulation.

In some embodiments, the rectifier includes first and second parallel circuit paths connected between an input port and an output port, with each circuit path including at least one of the plurality of active circuits and the antenna being coupled to each of the circuit paths. In some implementations, each circuit path includes an active circuit and a passive circuit, or two active circuits, with an antenna being coupled at respective nodes between the respective circuits in each path. The active circuits may, for example, include a transistor switched between on and off states to effect the modulation. The passive circuits may, for example, include a diode. Low power operation may be carried out, for example, by disabling an active circuit. Further, such operation may be facilitated by modulating the signal, without necessarily implementing a modulation-based ground connection (e.g., a second ground), mitigating issues including those described in the background above. Accordingly, full-active modes can be attained using exclusively active circuits in the respective circuit paths.

The modulation may be carried out in a variety of manners. In some embodiments, the modulator modulates each cycle in the waveform by disabling or enabling the at least one of the active circuits during the cycle. In certain embodiments, the modulator modulates each cycle in a waveform by, in a cycle immediately preceding the cycle to be modulated, selecting at least one of the plurality of active circuits to disable or enable, and disabling or enabling the selected at least one of the plurality of active circuits in the cycle to be modulated.

Another embodiment is directed to a method in which a signal having a waveform is passed to a rectifier having active circuits, with the rectifier being operable in a first mode that is at least a half-active mode in which at least one of the active circuits passes the signal, and operable in a second mode that consumes less power than the first mode. The waveform is modulated by selectively operating at least one of the plurality of active circuits, therein setting an impedance of the rectifier and modulating an amplitude of the signal.

In some implementations, the waveform is modulated by operating the rectifier in the at least half-active mode in which each current path has a transistor and a passive circuit in series, with the transistors being in an on state and current being passed through respective parallel current paths of the rectifier. In other implementations, the rectifier is operated in a full-active mode in which the current paths are implemented with two transistors in series and operating in an on state. In another implementation, the rectifier is operated in the second mode by operating at least one transistor in each current path in an on state.

Turning now to the figures, FIG. 1 shows a communication apparatus 100, in accordance with another example embodiment. The communication apparatus 100 includes a rectifier circuit 110, an antenna 120 and a modulator 130. The rectifier circuit 110 includes active circuits 112 and 114, and circuits 116 and 118 that are implemented as active circuits for certain embodiments and as passive circuits in other embodiments. The modulator 130 controls the active circuits for modulation, relative to data communicated via the antenna 120 (e.g., transmitted or received). Further, in various embodiments the antenna 120 also receives wireless power, which is used by the modulator 130 with the rectifier circuit 110 to carry out the modulation scheme.

In some embodiments, the communication apparatus 100 includes a state machine 140, which controls operation changes between active and passive modes. For instance, this control may be effected for changing modes while either all transistors are off or when a differential voltage between the AC input terminals (e.g., from antenna 120, similar to AC1/AC2 in FIGS. 2 and 3) is lower than the rectifier output voltage. This approach can be used to mitigate EMI radiation due to the changing of rectifier components between the active and passive modes while they are conducting current.

In certain embodiments, the communication apparatus 100 includes a shift register 150 that shifts enable/disable information to change operation of the apparatus from active rectification to passive rectification. The content of the shift register 150 can be shifted with each polarity change of the AC inputs or a fraction thereof (e.g., depending on the frequency ratio). If at least two active elements are used, active/passive information can be latched if both active elements are not conducting so that with the next conducting cycle, the other elements can operate in a passive or active mode.

Figure 2:
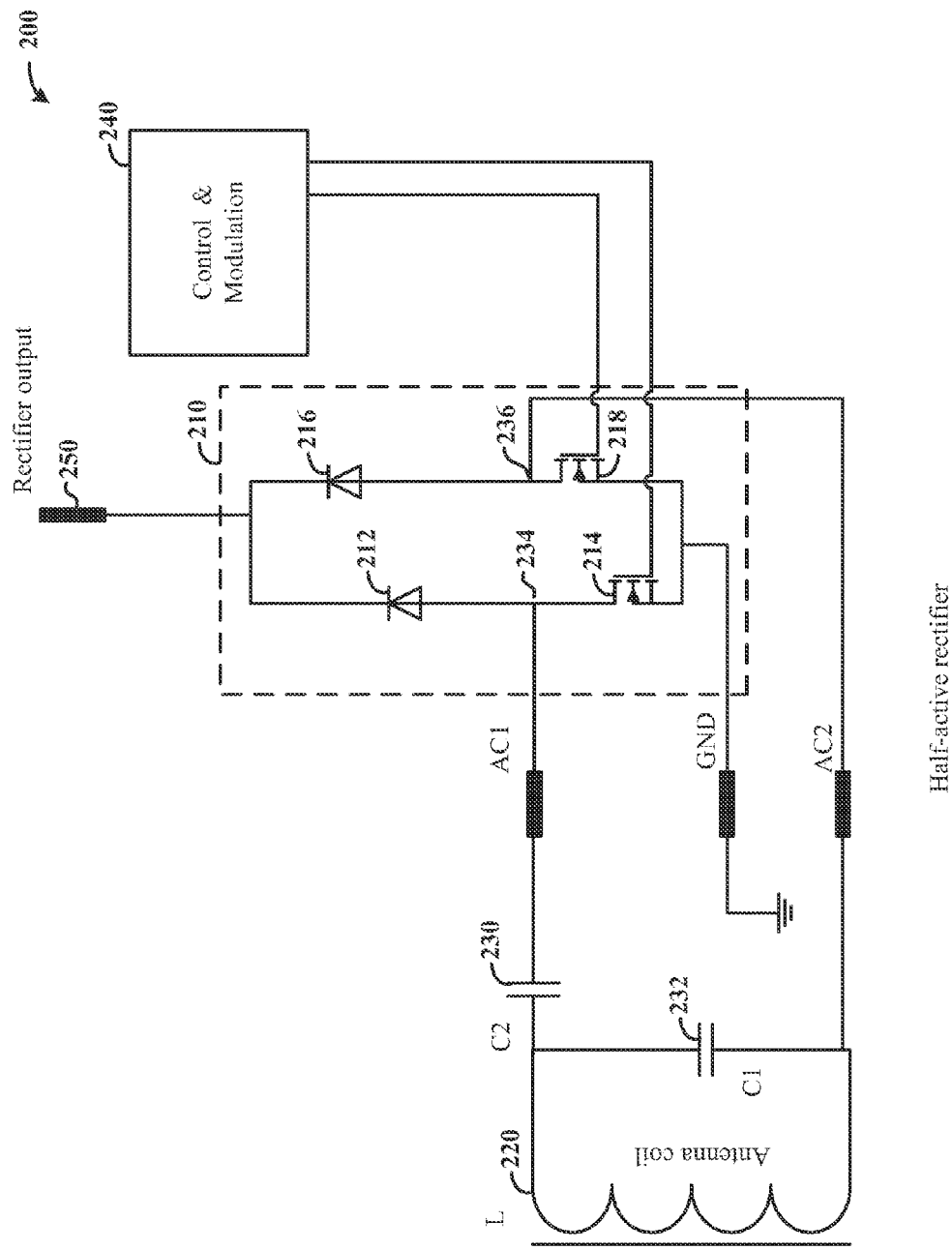
FIG. 2 shows a half-active rectifier with integrated rectifier control and modulator system, in accordance with another example embodiment.

FIG. 2 shows a half-active rectifier with integrated rectifier control and a modulator system 200, in accordance with another example embodiment. The system 200 includes a rectifier circuit 210, which carries out modulation for signals passed via antenna 220 and capacitors 230/232. A control and modulation circuit 240 operates to control the rectifier circuit 210.

More specifically, the rectifier circuit 210 includes parallel circuit paths with passive circuit 212 and active circuit 214 in a first path, and with passive circuit 216 and active circuit 218 in a second path. The antenna 220 is connected to respective nodes 234 and 236 between the active and passive circuits in each circuit path (with node 234 between passive circuit 212/active circuit 214, and node 236 between active circuits 216/218).

Accordingly, the control and modulation circuit 240 operates to selectively open and close transistors in the active circuits 216 and 218, therein setting an impedance provided at an rectifier output 250 of the rectifier circuit 210. Further, the control and modulation circuit 240 may be implemented relative to cycles of signals passed via the antenna 220. In some implementations, the control and modulation circuit 240 is operable to determine a switching scheme to apply to the active circuits 216 and 218 in a cycle prior to a cycle in which the switching is to be carried out.

Figure 3:
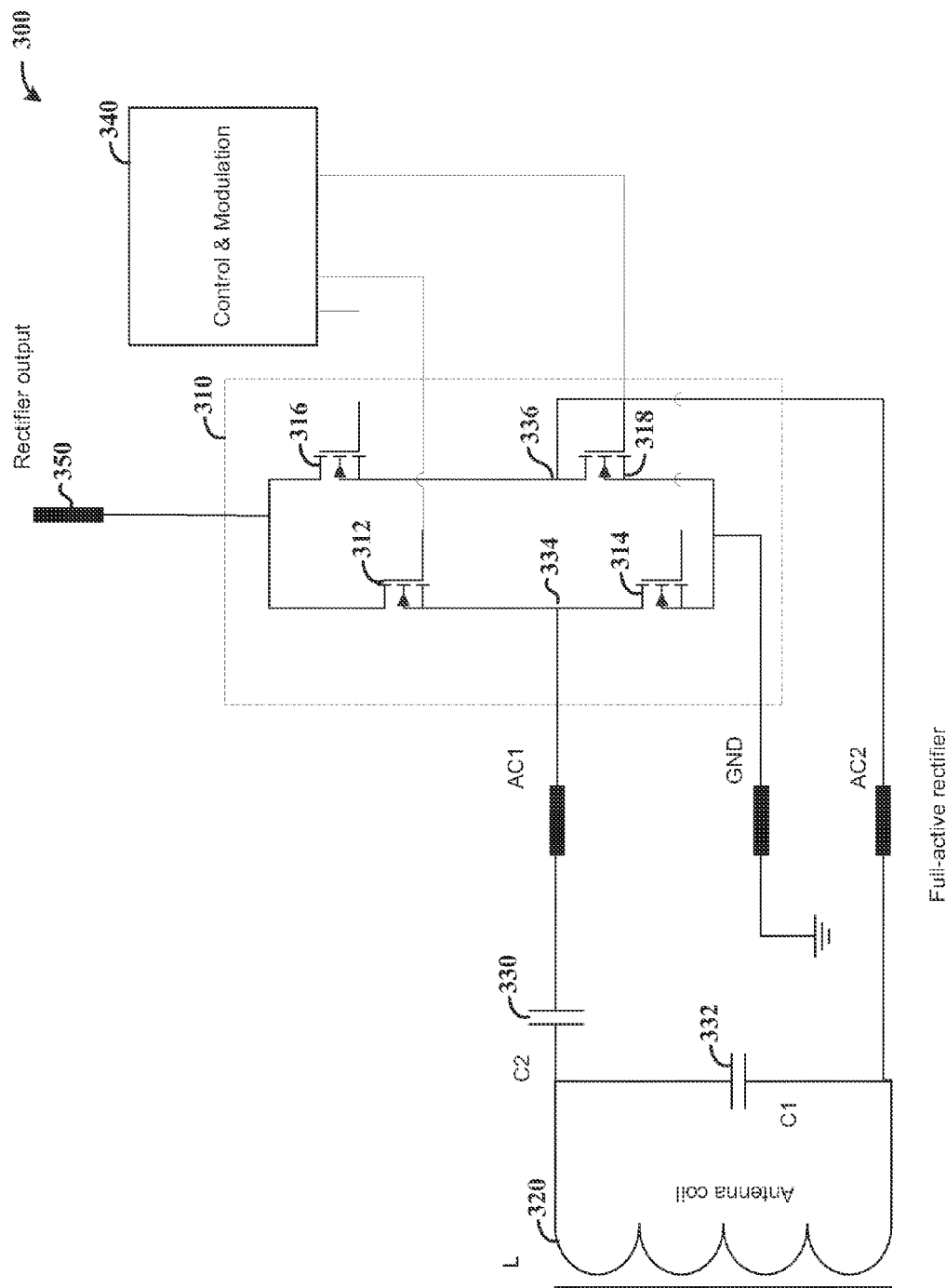
FIG. 3 shows a full-active rectifier with integrated rectifier control and modulator system, in accordance with another example embodiment.

FIG. 3 shows a full-active rectifier with integrated rectifier control and modulator system 300, in accordance with another example embodiment. The modulator system 300 includes rectifier circuit 310, which is shown connected to the antenna 320 via (optional) capacitors 330/332. The rectifier circuit 310 has parallel circuit paths with transistors (active circuits) 312 and 314 in a first path, and transistors 316 and 318 in a second path. The antenna 320 is connected between transistors (active circuits) 312 and 314 at node 334, and between transistors 316 and 318 at node 336.

A control and modulation circuit 340 sets an impedance of the rectifier circuit 310 by selectively opening and closing the transistors 312, 314, 316 and 318. For instance, by opening/closing the transistors based on a cyclic nature of signals passed via the antenna 320, modulation can be carried out via an impedance provided at a rectifier output 350 of the rectifier circuit 310.

In addition, the various embodiments described herein may be combined in certain embodiments, and various aspects of individual embodiments may be implemented as separate embodiments. For instance, aspects of FIG. 1 relating to the rectifier circuit 110 can be implemented using approaches as shown in FIGS. 2 and 3. Further, the modulator/modulation circuits and rectifiers shown in FIGS. 1-3 may be implemented in separate embodiments, such as to effect modulation control with other types of rectifiers.

The embodiments described herein are implemented in one or more of a variety of different applications. For instance, modulation as carried out herein may be implemented in one or more of a variety of manners, to suit particular embodiments. For example, ASK approaches may be carried out using predefined aspects within a controller as shown in one or more of the respective figures. In addition, wireless power transmission may be carried out with the antenna and rectifier circuits as described herein, in one or more of a variety of manners. For instance, inductive power received via an antenna shown in one or more of the figures can be harvested using inductive coils and passed to the circuitry, such as the controller/modulators shown. Such approaches may be implemented, for example, for smart cards, RFID tags, readers, power management chips (including system-on-chip power), and a variety of other wireless interfaces. For general information regarding modulation with wireless data transmission, and for specific information regarding modulation type approaches that may be implemented in connection with one or more embodiments, reference may be made to U.S. Pat. No. 8,274,370, which is fully incorporated herein by reference.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., modulation or control). For example, in certain of the above-discussed embodiments, one or more modules are discrete logic circuits or programmable logic circuits configured and arranged for implementing these operations/activities, as in the circuit modules shown in FIG. 1. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, further iterations of active circuit control may be implanted to augment impedance control and related modulation. Such modifications do not depart from the true spirit and scope of various aspects of the invention, including aspects set forth in the claims.

What is claimed is:

1. An apparatus comprising:
   an antenna circuit configured and arranged to provide a signal having a waveform;
   a rectifier circuit having at least four transistors coupled together and configured to form an active full-bridge rectifier having nodes coupled to the antenna circuit, each of the at least four transistors having a control electrode; and
   a modulator circuit coupled to the control electrodes of the at least four transistors of the active full-bridge rectifier, the modulator circuit configured and arranged to control an active switching function for the at least four transistors, wherein one or more of the at least four transistors is disabled for a number of cycles of the signal during the active switching function, wherein the number of cycles is greater than one and is for setting an impedance of the rectifier circuit and modulating an amplitude of the signal.

2. The apparatus of claim 1, wherein the active full-bridge rectifier includes first and second parallel circuit paths connected between an input port and an output port, each circuit path including at least two transistors of the at least four transistors, the antenna circuit being coupled to each of the first and second parallel circuit paths.

3. The apparatus of claim 2, wherein each circuit path includes two transistors of the at least four transistors, and wherein the antenna circuit is coupled to each of the first and second parallel circuit paths at respective nodes between the two transistors in each path.

4. The apparatus of claim 2, wherein each circuit path includes two transistors, and wherein the antenna circuit is coupled to each of the first and second parallel circuit paths at respective nodes between the two transistors in each path.

5. The apparatus of claim 2, wherein the modulator circuit is configured and arranged to modulate the waveform by selectively operating the transistors in each circuit path.

6. The apparatus of claim 2, wherein the modulator circuit is configured and arranged to modulate the waveform by selectively operating the rectifier circuit in first and second modes, via control of the transistors in on and off states, wherein the first mode is a low impedance mode and the second mode is a high impedance mode relative to the low impedance mode.

7. The apparatus of claim 6, wherein the rectifier circuit is configured and arranged to operate in the second mode via the disabling of at least one of the at least four transistors.

8. The apparatus of claim 6, wherein the rectifier circuit is configured and arranged to operate in the first mode via enabling of at least one of the at least four transistors.

9. The apparatus of claim 6, wherein the rectifier circuit is configured and arranged to operate in the first mode by operating in a full-active mode in which at least two transistors of the at least four transistors pass the signal between one another and to the output port.

10. The apparatus of claim 6, further including a state machine configured and arranged to switch the rectifier circuit between the first and second modes, and to mitigate interference by controlling switching of the at least four transistors between on and off states to occur when the at least four transistors are not conducting current.

11. The apparatus of claim 2, wherein each circuit path consists of two transistors of the at least four transistors connected in series between the input port and the output port.

12. The apparatus of claim 2, wherein each transistor of the at least four transistors comprises intrinsic arsenic.

13. The apparatus of claim 1, further including a capacitive energy-coupling circuit configured and arranged to provide energy harvested from wireless signals received via the antenna circuit, wherein the modulator circuit is configured and arranged to modulate the waveform by using the provided energy.

14. The apparatus of claim 1, wherein the modulator circuit is configured and arranged to modulate each cycle in the waveform by disabling or enabling the at least one of the at least four transistors during the cycle.

15. The apparatus of claim 1, wherein the modulator circuit is configured and arranged to modulate each cycle in the waveform by, in a cycle immediately preceding the cycle to be modulated, selecting the at least one of the at least four transistors to disable or enable, and disabling or enabling the selected at least one of the at least four transistors in the cycle to be modulated.

16. The apparatus of claim 1, further including a shift register configured and arranged to switch the rectifier circuit between active and passive rectification by shifting content of the shift register in response to polarity changes of the signal provided via inputs from the antenna circuit, therein facilitating switching of the at least four transistors during a subsequent cycle.

17. A method comprising:
providing a signal having a waveform;
passing the signal to a rectifier, the rectifier having at least four transistors coupled together and configured to form an active full-bridge rectifier having input nodes coupled to receive the signal having the waveform, each of the at least four transistors having a control electrode; and
modulating the waveform with a modulator circuit coupled to the control electrodes of the at least four transistors of the active full-bridge rectifier, the modulator circuit configured and arranged to control an active switching function for the at least four transistors, wherein one or more of the at least four transistors is disabled for a number of cycles of the signal during the active switching function, wherein the number of cycles is greater than one and is for setting an impedance of the rectifier and modulating an amplitude of the signal.

18. The method of claim 17, wherein modulating the waveform includes one of:
operating the rectifier in a first mode by operating the at least four transistors in an on state; and
operating the rectifier in a second mode by operating at least one of the transistors in an off state.

* * * * *